US011125907B2

(12) United States Patent
Bloem et al.

(10) Patent No.: US 11,125,907 B2
(45) Date of Patent: Sep. 21, 2021

(54) OCCUPANCY SENSING SYSTEMS AND METHODS

(71) Applicant: Steelcase Inc., Grand Rapids, MI (US)

(72) Inventors: Michael Bloem, Grand Rapids, MI (US); Marcus Ward, Portland, OR (US); Mychal Hall, Portland, OR (US)

(73) Assignee: Steelcase Inc., Grand Rapids, MI (US)

( * ) Notice: Subject to any disclaimer, the term of this patent is extended or adjusted under 35 U.S.C. 154(b) by 31 days.

(21) Appl. No.: 16/415,647

(22) Filed: May 17, 2019

(65) Prior Publication Data

US 2019/0353824 A1    Nov. 21, 2019

Related U.S. Application Data

(60) Provisional application No. 62/673,776, filed on May 18, 2018.

(51) Int. Cl.
*G01V 8/10*        (2006.01)
*G05B 15/02*       (2006.01)

(52) U.S. Cl.
CPC .............. *G01V 8/10* (2013.01); *G05B 15/02* (2013.01)

(58) Field of Classification Search
CPC .................................. G01V 8/10; G05B 15/02
See application file for complete search history.

(56) References Cited

U.S. PATENT DOCUMENTS

| 4,882,567 A | 11/1989 | Johnson |
| 5,581,236 A | 12/1996 | Hoseit et al. |
| 5,640,143 A | 6/1997 | Myron et al. |
| 5,656,995 A | 8/1997 | Peters |
| 5,986,357 A | 11/1999 | Myron et al. |
| 6,078,253 A | 6/2000 | Fowler |
| 6,791,458 B2 | 9/2004 | Baldwin |
| 6,909,921 B1 | 6/2005 | Bilger |
| 6,992,577 B2 | 1/2006 | Tsuji et al. |
| 7,034,675 B2 | 4/2006 | DiPoala et al. |

(Continued)

FOREIGN PATENT DOCUMENTS

| WO | 2005106820 A1 | 11/2005 |
| WO | 2017076433 A1 | 5/2017 |

OTHER PUBLICATIONS

Chung, et al., Empirical Evaluation of Gated Recurrent Neural Networks on Sequence Modeling, 2014, arXiv preprint arXiv:1412.3555, 9 pages.

(Continued)

*Primary Examiner* — Blake C Riddick
(74) *Attorney, Agent, or Firm* — Quarles & Brady LLP

(57) ABSTRACT

The present disclosure provides systems and methods for improved occupancy sensing. The methods and systems can deploy various signal threshold adjustments and/or signal analysis algorithms in response to sensed signals having a given quality, such as exceeding a threshold. In some cases, signal thresholds are lowered following an initial generated signal exceeding a first, higher threshold. In some cases, time-dependent signals are monitored using algorithms that analyze the signals for variations that are characteristic of human usage. Methods are disclosed for determining if two motion sensors are observing the same or overlapping spaces. Systems and methods for calibrating motion sensing systems are also disclosed.

14 Claims, 13 Drawing Sheets

(56) References Cited

U.S. PATENT DOCUMENTS

| | | |
|---|---|---|
| 7,123,139 B2 | 10/2006 | Sweeney |
| 7,298,253 B2 | 11/2007 | Petricoin et al. |
| 7,375,630 B2 | 5/2008 | Babich et al. |
| 7,411,489 B1 | 8/2008 | Elwell et al. |
| 7,482,918 B2 | 1/2009 | Mien |
| 7,623,676 B2 | 11/2009 | Zhao et al. |
| 7,735,918 B2 | 6/2010 | Beck |
| RE41,674 E | 9/2010 | Sasaki et al. |
| 7,896,436 B2 | 3/2011 | Kurrasch et al. |
| 8,009,042 B2 | 8/2011 | Steiner et al. |
| 8,310,365 B2 | 11/2012 | Siegler, II et al. |
| 8,410,445 B2 | 4/2013 | Kim et al. |
| 8,558,179 B2 | 10/2013 | Filson et al. |
| 8,577,711 B2 | 11/2013 | Korecki et al. |
| 8,630,741 B1 | 1/2014 | Matsuoka et al. |
| 8,654,197 B2 | 2/2014 | Nizko et al. |
| 8,743,198 B2 | 6/2014 | Padmanabh et al. |
| 8,797,159 B2 | 8/2014 | Kirkpatrick et al. |
| 9,035,769 B2 | 5/2015 | Steiner et al. |
| 9,148,937 B2 | 9/2015 | Steiner et al. |
| 9,177,195 B2 | 11/2015 | Marcheselli et al. |
| 9,189,751 B2 | 11/2015 | Matsuoka et al. |
| 9,265,128 B2 | 2/2016 | Steiner et al. |
| 9,277,629 B2 | 3/2016 | Steiner et al. |
| 9,288,619 B2 | 3/2016 | Arteaga et al. |
| 9,310,253 B2 | 4/2016 | Katz |
| 9,332,617 B2 | 5/2016 | Mans et al. |
| 9,377,209 B2 | 6/2016 | Kopp |
| 9,459,601 B2 | 10/2016 | Morrow |
| 9,514,636 B2 | 12/2016 | Modi et al. |
| 9,601,001 B2 | 3/2017 | Matsuoka et al. |
| 9,671,526 B2 | 6/2017 | Kumar |
| 2005/0001154 A1 | 1/2005 | Sumitomo et al. |
| 2007/0161270 A1 | 7/2007 | Insalaco et al. |
| 2008/0211668 A1 | 9/2008 | Dixon et al. |
| 2010/0097226 A1 | 4/2010 | Parsons |
| 2010/0299116 A1 | 11/2010 | Tomastik et al. |
| 2011/0169637 A1 | 7/2011 | Siegler, II et al. |
| 2012/0078676 A1 | 3/2012 | Adams et al. |
| 2013/0099124 A1 | 4/2013 | Filson et al. |
| 2013/0173062 A1 | 7/2013 | Koenig-Richardson |
| 2014/0079282 A1 | 3/2014 | Marcheselli et al. |
| 2014/0277757 A1 | 9/2014 | Wang et al. |
| 2014/0278389 A1* | 9/2014 | Zurek .................. G10L 15/20 704/231 |
| 2015/0120360 A1 | 4/2015 | Adriaenssens et al. |
| 2015/0294142 A1* | 10/2015 | Gruenwald ............ G01S 7/497 348/46 |
| 2015/0308706 A1 | 10/2015 | Bunker et al. |
| 2015/0334809 A1 | 11/2015 | Mans et al. |
| 2016/0025367 A1 | 1/2016 | Matsuoka et al. |
| 2016/0116343 A1* | 4/2016 | Dixon .................. H05B 47/11 250/342 |
| 2016/0126733 A1* | 5/2016 | Hick ................... H05B 47/105 700/295 |
| 2016/0183687 A1 | 6/2016 | Hoyt et al. |
| 2016/0343243 A1 | 11/2016 | Rabb et al. |
| 2017/0017219 A1 | 1/2017 | Morrow |
| 2017/0105268 A1* | 4/2017 | Balasubramainian .................. H05B 47/20 |
| 2017/0105269 A1 | 4/2017 | Balasubramainian et al. |
| 2017/0160428 A1 | 6/2017 | Kumar |
| 2017/0309038 A1* | 10/2017 | Dorster ............... H05B 47/125 |
| 2017/0328777 A1* | 11/2017 | Zeckendorf ............. G01J 5/34 |
| 2018/0195706 A1* | 7/2018 | Chemel ............... H05B 47/115 |
| 2018/0292520 A1* | 10/2018 | Bermudez ........... H05B 47/105 |
| 2019/0228624 A1* | 7/2019 | Kostrun ............ G08B 13/1895 |

OTHER PUBLICATIONS

Hochreiter, et al., Long Short-Term Memory, Neural Computation, 1997, 9(8):1735-1780.

* cited by examiner

OCCUPANCY SENSING SYSTEMS AND METHODS

CROSS-REFERENCE TO RELATED APPLICATIONS

This application claims priority to U.S. provisional application Ser. No. 62/673,776, filed on May 18, 2018, which is incorporated by reference herein in its entirety.

STATEMENT REGARDING FEDERALLY SPONSORED RESEARCH

N/A

BACKGROUND

Occupancy and presence sensing technology is presently deployed in a variety of contexts. Most individuals are familiar with a passive infrared (PIR) sensor that controls room lights. Many of those individuals have experienced the situation where sitting still for too long causes the lights to shut off. The response is for the individual to wave their arms to provide some motion for the PIR sensor to trigger reactivation of the lights. Similarly, many of those individuals have experienced the situation where merely walking past a room is sufficient to trigger a PIR sensor into determining that a space is occupied, thus causing the lights to turn on despite the absence of any individuals within the space. In the context of lighting, this level of occupancy sensing is sufficient, because the cost (brief lack of lighting and having to wave arms or brief presence of lighting where it is not needed) is relatively inconsequential. However, with the advent of more advanced workspaces that include more complex automated processes, such as room reservations that can automatically adjust based on the occupancy status of a given location, activity/productivity tracking/monitoring that can make determinations regarding how people are utilizing various spaces and/or affordances, and other such processes, more accurate occupancy determinations are needed than those provided by traditional occupancy sensing systems.

Accordingly, a need exists for occupancy sensing systems and methods that are robust in terms of their ability to accurately sense occupancy and are also low cost to make and use.

BRIEF SUMMARY

The present disclosure provides systems and methods for improved occupancy sensing.

In one aspect, the present disclosure provides a method of operating a motion sensor system. The motion sensor system includes a motion sensor that generates a motion signal in response to a sensed motion in a space to which the motion sensor is associated. The method includes: a) operating the motion sensor in a high threshold operating mode, wherein the high threshold operating mode includes a first signal threshold; and b) subsequent to step a), in response to the motion signal exceeding the first signal threshold, operating the motion sensor in a low threshold operating mode, wherein the low threshold operating mode includes a second signal threshold that is lower than the first signal threshold.

In another aspect, the present disclosure provides a method of operating a motion sensor system. The motion sensor system includes motion sensor that generates a motion signal in response to a sensed motion in a space to which the motion sensor is associated. The method includes: a) operating the motion sensor in a high threshold operating mode, wherein the high threshold operating mode includes a first signal threshold; b) subsequent to step a), in response to the motion signal exceeding the first signal threshold, operating the motion sensor with a threshold adjustment function having a time-dependent signal threshold, wherein the time-dependent signal threshold is lower than the first signal threshold for at least a portion of the threshold adjustment function.

In yet another aspect, the present disclosure provides a method of operating a motion sensor system. The motion sensor system includes a motion sensor that generates a motion signal in response to a sensed motion in a space to which the motion sensor is associated. The method includes: a) acquiring the motion signal from the motion sensor over a predetermined length of time, thereby providing a time-dependent motion signal; b) processing the time-dependent motion signal using a human-like motion analysis algorithm that distinguishes between motions having a time-varying component that is characteristic of human movement; and c) in response to the human-like motion analysis algorithm determining that a motion is characteristic of human movement, providing an occupancy signal indicative of occupancy of a space to which the motion sensor is associated.

In a further aspect, the present disclosure provides a motion sensor system. The motion sensor system includes a motion sensor, a processor, and a memory. The memory has stored thereon instructions that, when executed by the processor, cause the processor to execute the methods described herein.

In yet another additional aspect, the present disclosure provides a method of operating a motion sensor system. The motion sensor system includes a motion sensor having a fall sensor and at least one other motion sensor. The method includes: a) making a determination of motion within a space using the motion sensor system by receiving motion signals from the motion sensor; and b) in response to receiving a fall signal from the fall sensor that is representative of a falling motion, discontinuing utilizing the motion signals in making the determination of motion of step a), while continuing making the determination of motion utilizing other motion signals from the at least one other motion sensor.

In yet a further aspect, the present disclosure provides a method of sensing motion using a motion sensing system including two or more motion sensor. The method includes: a) for each of the two or more motion sensors, generating a motion confidence index that includes a probability that a given motion sensor is sensing a desired motion of interest; b) sending the motion confidence index for each of the two or more motion sensors to a processor; and c) using the motion confidence index for each of the two or more motion sensors, determining whether or not the desired motion of interest occurred.

In another aspect, the present disclosure provides a method of identifying relative positioning, location, and/or orientation of two or more motion sensors of a motion sensing system. The method includes: a) acquiring motion sense signals with the two or more motion sensors; b) comparing the acquired motion sense signals to determine if the two or more motion sensors are acquiring the same motions; and c) in response to the comparing of step b), deducing information regarding the relative positioning and/or orientation of the two or more sensors.

In yet another aspect, the present disclosure provides a method of tuning an occupancy determination algorithm to a specific space having known characteristics. The method includes: a) receiving the known characteristics of the specific space; and b) adjusting one or more parameters of the occupancy determination algorithm in response to the known characteristics.

In an additional aspect, the present disclosure provides a motion sensor calibration tool for calibrating a motion sensor system. The motion sensor system includes a motion sensor having a field of view, a processor, and a memory. The motion sensor calibration tool includes a sensor signal generator. The memory has stored thereon instructions that, when executed by the processor, cause the processor to initiate a signal generation algorithm in the sensor signal generator that, when the sensor signal generator is located the field of view of the motion sensor, produces a predictable motion signal from the motion sensor, and further calibrate the motion sensing system based on the predictable motion signal.

In another aspect, the present disclosure provides a method of calibrating a motion sensing system including a motion sensor. The method includes: a) emitting an electromagnetic radiation of a known magnitude at a known location or moving a motion target at the known location, the known location positioned within a field of view of the motion sensor; b) measuring a calibration motion signal using the motion sensor during the emitting or moving of step a); and c) calibrating the motion sensing system using the calibration motion signal and the known location.

DETAILED DESCRIPTION

Figure 1:
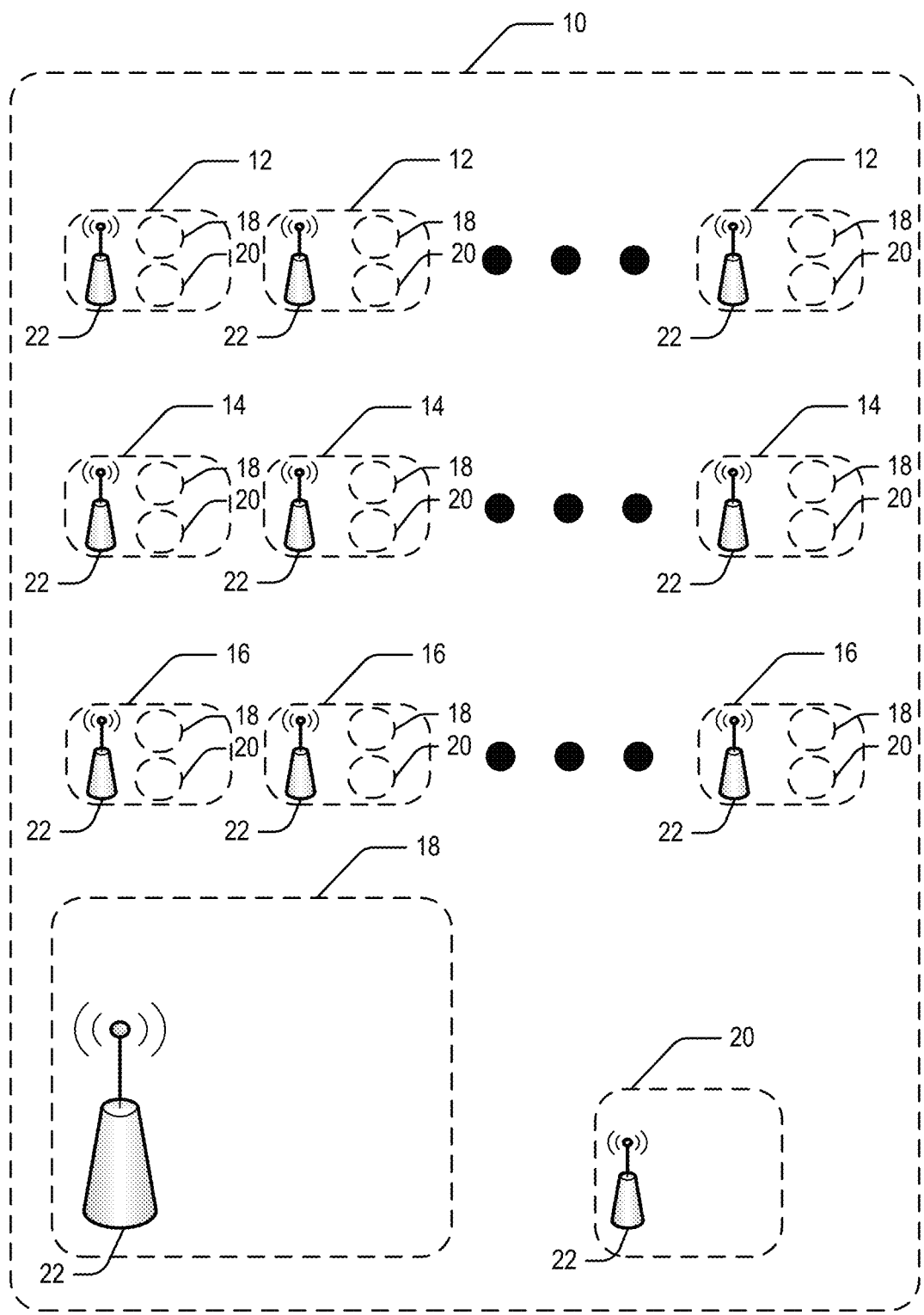
FIG. 1 is a schematic representation of a system in accordance with the present disclosure.

Before the present invention is described in further detail, it is to be understood that the invention is not limited to the particular embodiments described. It is also to be understood that the terminology used herein is for the purpose of describing particular embodiments only, and is not intended to be limiting. The scope of the present invention will be limited only by the claims. As used herein, the singular forms "a", "an", and "the" include plural embodiments unless the context clearly dictates otherwise.

It should be apparent to those skilled in the art that many additional modifications beside those already described are possible without departing from the inventive concepts. In interpreting this disclosure, all terms should be interpreted in the broadest possible manner consistent with the context. Variations of the term "comprising", "including", or "having" should be interpreted as referring to elements, components, or steps in a non-exclusive manner, so the referenced elements, components, or steps may be combined with other elements, components, or steps that are not expressly referenced. Embodiments referenced as "comprising", "including", or "having" certain elements are also contemplated as "consisting essentially of" and "consisting of" those elements, unless the context clearly dictates otherwise. It should be appreciated that aspects of the disclosure that are described with respect to a system are applicable to the methods, and vice versa, unless the context explicitly dictates otherwise.

Numeric ranges disclosed herein are inclusive of their endpoints. For example, a numeric range of between 1 and 10 includes the values 1 and 10. When a series of numeric ranges are disclosed for a given value, the present disclosure expressly contemplates ranges including all combinations of the upper and lower bounds of those ranges. For example, a numeric range of between 1 and 10 or between 2 and 9 is intended to include the numeric ranges of between 1 and 9 and between 2 and 10.

As used herein, "passive motion sensor" refers to a sensor that does not actively emit a signal that is used for sensing, but rather includes only a detection aspect for sensing a signal that is relevant to motion and/or presence. Examples of passive motion sensors include, but are not limited to, passive infrared sensors, capacitive proximity sensors, accelerometers, pressure sensors and other sensors known to those having ordinary skill in the art to function on similar principles to the passive infrared sensor.

The present disclosure relates to systems and methods for monitoring motion, presence, occupancy, or the like using one or more passive motion sensors. The passive motion sensors can be space sensors, which are configured to monitor motion within a broader space. The passive motion sensors can be boundary sensors, which are configured to monitor motion within a narrower space to determine when a boundary is penetrated.

The present disclosure also relates to systems and methods for monitoring motion, present, occupancy, or the like using one or more motion sensors that can be active or passive motion sensors. Again, these sensors can be space sensors, boundary sensors, or other sensors known to those having ordinary skill in the art.

Referring to FIG. 1, this disclosure provides a system 10 for monitoring occupancy of a space. The system can include one or more space sensors 12, one or more boundary sensors 14, and one or more gateways 16. The system 10 can also include a processor 18 and a memory 20. Each of the space sensors 12, boundary sensors 14, gateways 16, processor 18, and memory 20 can include a wireless communication transceiver 22. While a wireless communication embodiment is illustrated, any of the components of system 10 can be hardwired to one another as understood by those having ordinary skill in the art. In some cases, the system 10 can be deployed with one or more space sensors 12 and without any boundary sensors 14. In some cases, the system 10 can be deployed with one or more boundary sensors 14 and without any space sensors 12. In some cases, the system 10 can be deployed without the one or more gateways 16. In those cases, the one or more space sensors 12 and the one or more boundary sensors 14 can be configured to communicate directly with the processor 18. In some cases, the one or more space sensors 12, the one or more boundary sensors 14, and the one or more gateways 16 can include a processor 18 and a memory 20 locally co-housed with the respective sensors and/or gateways.

Figure 2:
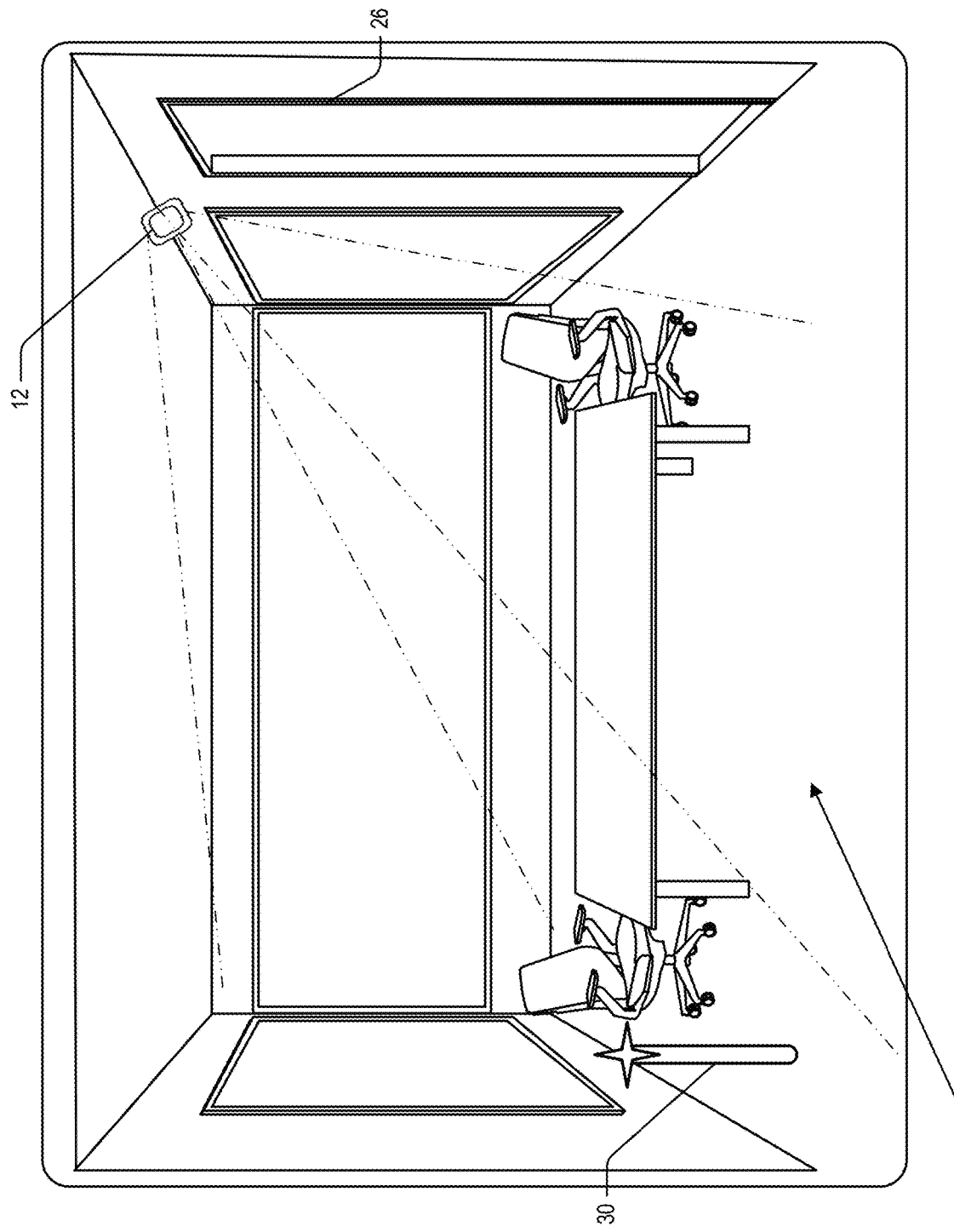
FIG. 2 is a space showing deployment of a system in accordance with the present disclosure.

Referring to FIG. 2, one exemplary aspect of the system 10 is illustrated. In this aspect, the space 24 is the area of the room that is capable of being monitored by a single passive sensor. The system 10 include a single passive sensor in the form of a space sensor 12. The space sensor 12 is mounted above the door 26.

Figure 3:
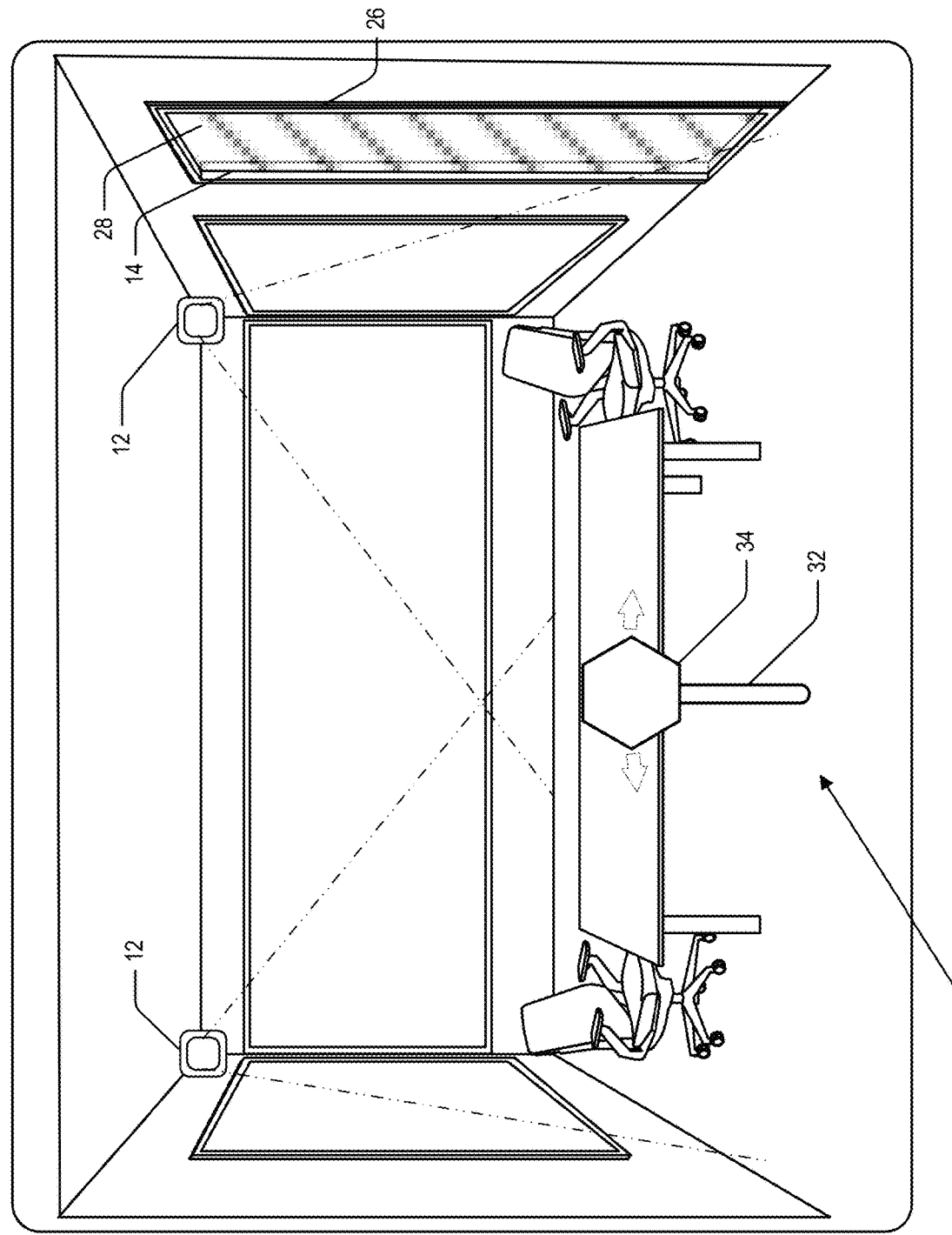
FIG. 3 is a space showing deployment of a system in accordance with the present disclosure.

Referring to FIG. 3, one exemplary aspect of the system 10 is illustrated. In this aspect, the space 24 is the entire area of a room. The system 10 includes two space sensors 12 mounted in corners of the room (note: more or less space sensors 12 can be deployed and they can be placed in different locations, depending on the desired sensing properties). In this illustrated aspect, the only way into our out of the room is via a door 26. A boundary sensor 14 is mounted in the vicinity of the door or within a part of the door, such as the door frame, and is configured to project a boundary field 28 into the doorway. The boundary sensor 14 is configured to sense when the boundary field 28 is penetrated by an object.

Figure 4:
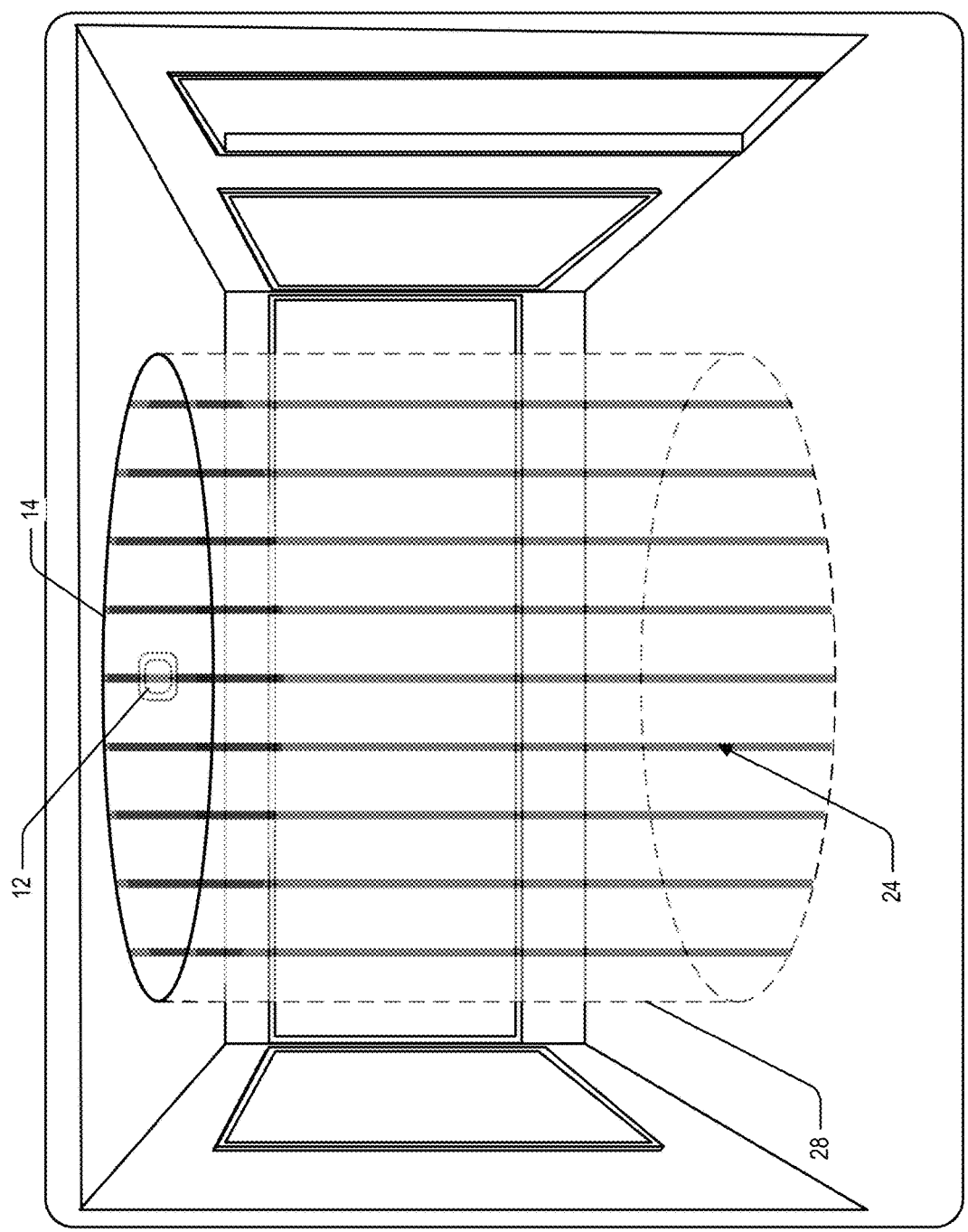
FIG. 4 is a space showing deployment of a system in accordance with the present disclosure.

Referring to FIG. 4, another exemplary aspect of the system 10 is illustrated. In this aspect, the space 24 is a portion of the area of the room. The system 10 includes one space sensor 12 mounted directly above the space 24. In this illustrated aspect, the space 24 can be entered from any horizontal direction (i.e., it cannot be entered from above, due to the ceiling, or below, due to the floor). A boundary sensor 14 is mounted and configured to project a boundary field 28 that covers at least a portion of the boundary of the space 24. In the illustrated aspect, the boundary sensor 14 projects a cylindrical boundary field 28 that covers the entirety of the boundary of the space. In other aspects, the system 10 can include more than one boundary sensor 14 that each projects a boundary field 28 that covers a portion of the boundary of the space, with the total coverage provided by the multiple boundary fields 28 being sufficient to sense penetration of the boundary.

Figure 5:
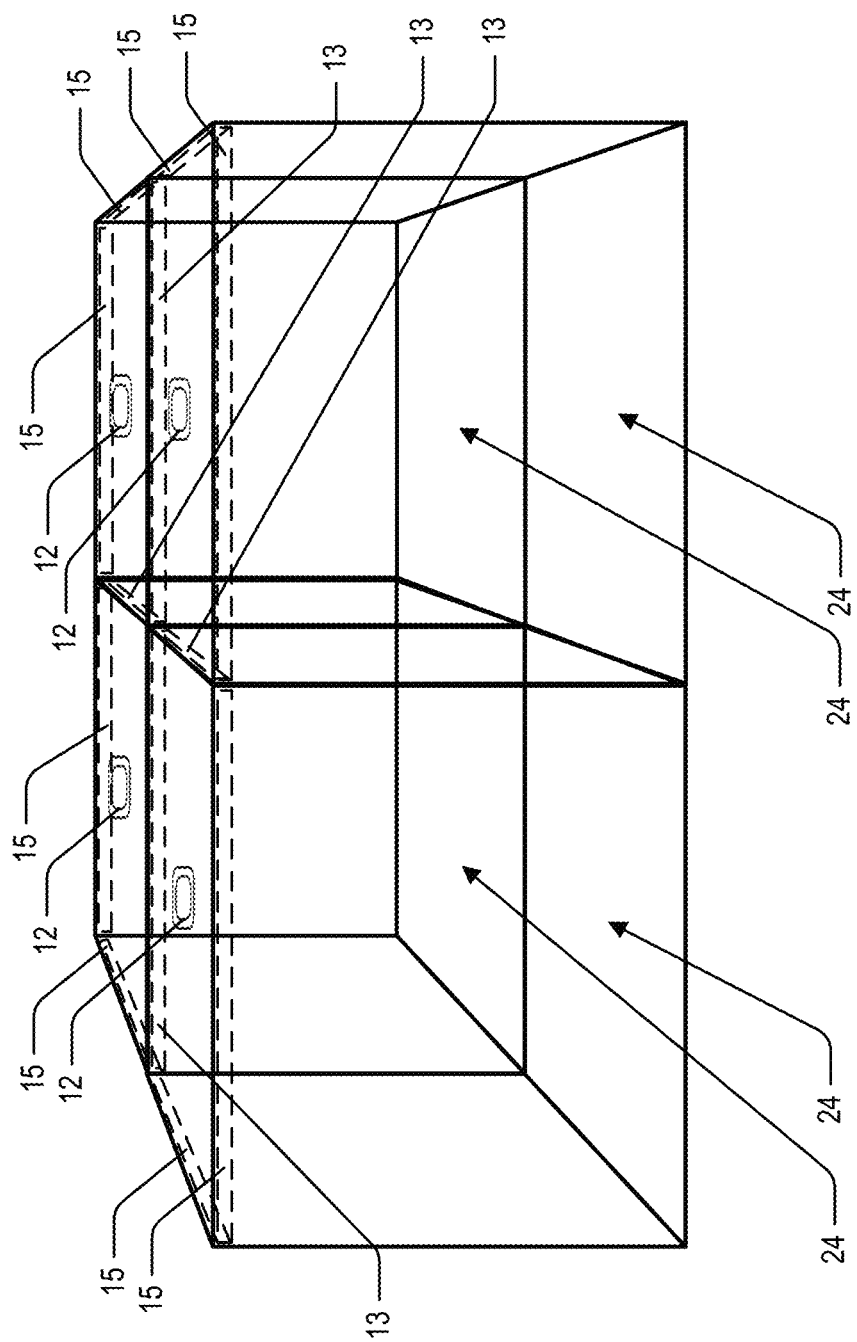
FIG. 5 is a space showing deployment of a system in accordance with the present disclosure.

Referring to FIG. 5, another exemplary aspect of the system 10 is illustrated. In this aspect, the space 24 is an area within an open floor plan and the open floor plan includes multiple spaces 24. The system 10 includes at least one space sensor 12 for each space 24. The space sensor 12 can be configured and positioned to provide sufficient coverage of each space 24. One or more boundary sensors 14 are mounted and configured to project one or more boundary fields 28 (not illustrated in this FIG. for ease of viewing, but would be projected along the vertical sides of each cube representing space 24) that cover at least a portion of the boundary of the space 24. In the illustrated aspect, the spaces 24 are square or block shaped and the boundary sensors 24 are configured to project the boundary fields 28 in a linear fashion along the edges of the square- or box-shaped spaces 24. In this case, the system 10 can utilize a single boundary sensor 14 to sense the boundary of multiple spaces 24, such as two neighboring spaces 24 that share a single boundary. The internal boundary sensors 13 are configured to monitor the boundary between two adjacent spaces 24 and the external boundary sensors 15 are configured to monitor the boundary between a space 24 and surrounding areas.

Figure 6:
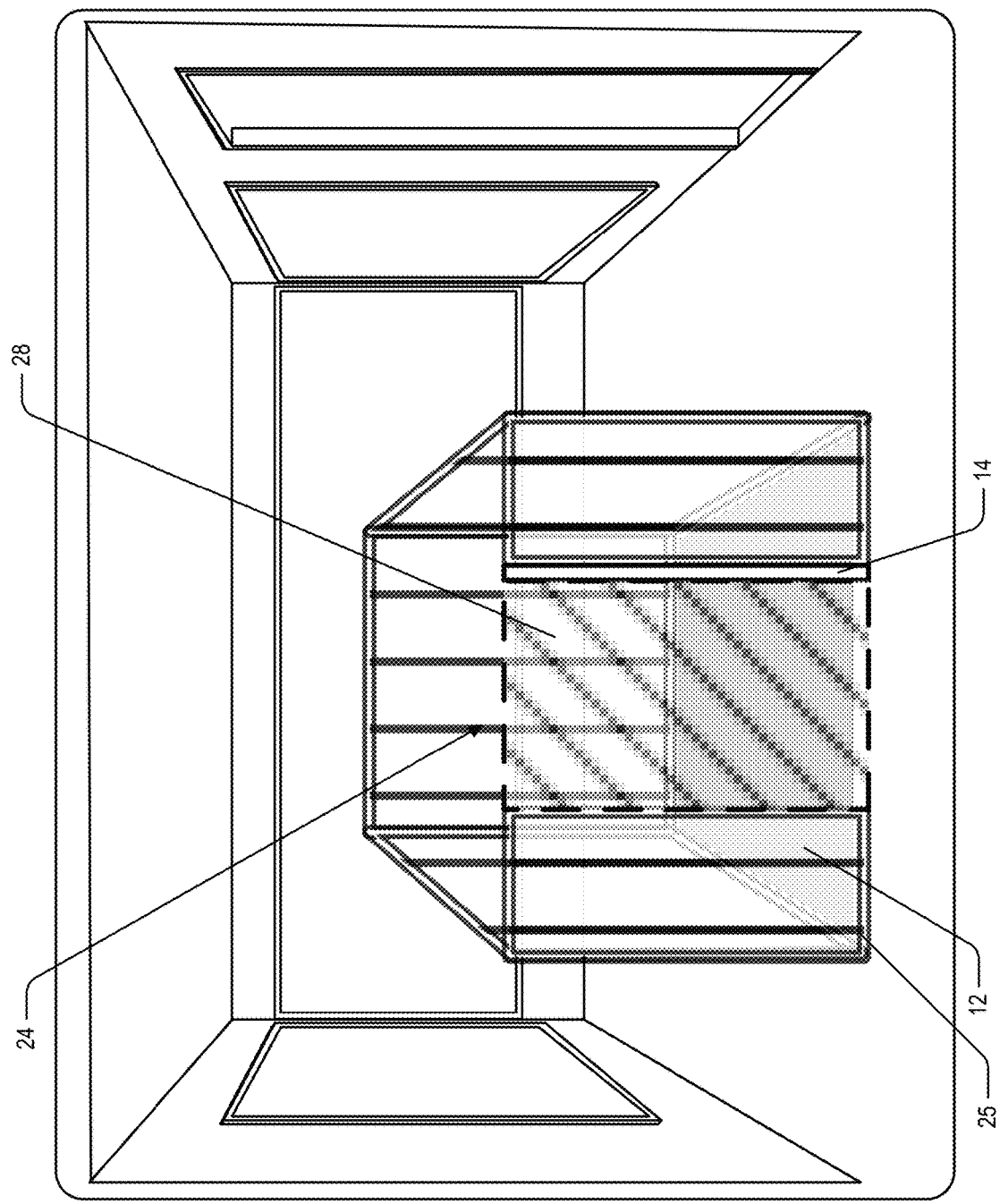
FIG. 6 is a space showing deployment of a system in accordance with the present disclosure.

Referring to FIG. 6, another exemplary aspect of the system 10 is illustrated. In this aspect, the space 24 is a workstation bounded by partition panels 25, and the specifically illustrated aspect shows a cubicle. The system can include at least one area of volume sensor 12 for the space 24, such as the illustrated pressure-sensitive mat. One or more boundary sensors 14 can be mounted and configured to project one or more boundary field 28 across an entrance to the cubicle. In some cases, the one or more boundary sensors 14 can be positioned to only monitor movement through the entrance to the cubicle, while in other cases, the one or more boundary sensors 14 can be positioned to monitor movement between the tops of the partition panels 25 and the ceiling.

The space 24 can be a room, a workstation bounded by partition panels, such as personal semi-open working environment or a cubicle, an arbitrarily-defined area or volume, or another location where a determination of occupancy status is desired. It should be appreciated that, while the system 10 is described in the context of these spaces 24, the inventive concept of the present disclosure can be used in any occupancy determination context. The concepts are applicable not only to spaces 24, but any permanent object.

The system 10 can include one or more space sensors 12 positioned in the space or locations near to the space. The one or more space sensors 12 can be configured to monitor an area or a volume within the space 24. The one or more space sensors 12 can be oriented to monitor a portion of the space or the entire space. Examples of suitable space sensors 12 include, but are not limited to, passive infrared (PIR) sensors, floor pressure sensors, ultrasonic sensors, microwave sensors, other infrared sensors (e.g., thermopile, thermopile array, infrared camera, etc.), video sensors, acoustic sensors, and the like.

The space sensors 12 can be battery operated. In some cases, the systems and methods described herein can extend battery lifetime by reducing the amount of communication signals necessary to make an occupancy determination.

In cases where a single space sensor 12 is deployed, the space sensor 12 can be configured to provide high coverage of the space 24, such as at least 90%, at least 95%, or at least 99% coverage of the space 24, or low coverage of the space 24, such as at most 50%, at most 25%, or at most 10% coverage of the space 24.

In cases where multiple space sensors 12 are deployed, the layout of the space sensors can be configured to provide high coverage of the space, such as at least 90%, at least 95%, or at least 99% coverage of the space, or low coverage of the space, such as at most 50%, at most 25%, or at most 10% coverage of the space 24.

It should be appreciated that the coverage described here is not only suitable for the function of the present disclosure, but in fact, the present disclosure contemplates low coverage situations where occupancy can still be accurately determined.

It should be appreciated that some space sensors 12 can have "soft edges" to the area of coverage they provide. For example, 70% of a space can be covered extremely well, 20% can be covered somewhat well, and 10% can be covered poorly. For the purposes of defining coverage in the space sensor 12 context, a space sensor 12 can be considered to cover a volume if the space sensor 12 detects motion of a hand-sized object moving back and forth over a distance of 0.5 meters.

In certain cases, the space sensor 12 can be a motion sensor that senses motion within the space.

In certain cases, the space sensor 12 can be a pressure sensor, for example a floor or mat that is pressure sensitive, which senses pressure in a floor located in the space.

In certain cases, the space sensor 12 can be an ultrasonic or Doppler sensor.

The space 24 can have a boundary. In some cases, the boundary is defined by a door or other passageway, ingress, egress, or the like. In other cases, the boundary is an arbitrarily-defined area.

The system can include one or more boundary sensors 14 positioned and configured to monitor penetration of at least a portion of the boundary. Examples of suitable boundary sensors 14 include, but are not limited to, curtain sensors, such as optical curtain sensors or magnetic curtain sensors, break-beam (also known as, "electric eye") sensors, other infrared curtain sensors (e.g., thermopile, thermopile array, infrared camera, etc.), video sensors, and the like.

In certain cases, the one or more boundary sensors 14 can be configured to provide at least 90%, at least 95%, or at least 99% coverage of the boundary of the space. For the purposes of defining coverage in the boundary sensor 14 context, a boundary sensor 14 can be considered to cover an area of the boundary if the boundary sensor 14 detects movement of a golf ball sized object through the boundary.

The boundary sensors 14 can in some instances be directional boundary sensors that can sense the direction of movement through the boundary. For example, if two boundary sensors 14 are placed on the boundary with a very small distance separating the boundary sensors 14, then the small difference in timing between sensing penetration can be used to determine the direction of travel.

The space sensors 12 and boundary sensors 14 can be configured to communicate via a low energy consumption communication protocol, such as Bluetooth®, including Bluetooth® 4.0, Bluetooth® 4.1 Bluetooth® 4.2, Bluetooth® 5.0, Bluetooth® LE, and Bluetooth® Smart, IEEE802.15.4 (ZigBee®, 6LoWPAN, Thread®), via IEEE802.11 (WiFi), and the like. Of course, this protocol can be used with other, later issued low energy consumption communication protocols, as well as with other communication protocol specifications.

The system can include one or more gateways 16 configured to send signals to and receive signals from the one or more space sensors 12 and the one or more boundary sensors 14. In instances where the one or more gateways 16 include at least two gateways 16, the at least two gateways 16 can be configured to communicate with one another via a low energy consumption communication protocols, such as Bluetooth®, via IEEE802.3 Ethernet, via IEEE802.11 (WiFi), and the like.

In some cases, the sensors 12, 14 can be integrated into a single unit. For example, a single unit residing above a door could monitor a space using a space sensor 12 and simultaneous monitor penetration of the door using a boundary sensor.

In some cases, the sensors 12, 14 and the communication capabilities of the gateway 16 can be integrated into a single unit.

The system can include a processor 18 and a memory 20 that are in wired or wireless electronic communication with the gateway 16. The processor 18 and memory 20 can be integrated into the gateway 16 or can be remote from the gateway 16. In some cases, the processor 18 and memory 20 can be housed within the same facility as the sensors 12, 14 and gateway 16. In other cases, the processor and memory can be housed within a different facility than the sensors and gateway. For example, the processor 18 and memory 20 can be cloud computing systems.

The processor 18 can be configured to communicate with the gateway via a low energy consumption communication protocol, such as Bluetooth®, via IEEE802.3 Ethernet, via IEEE802.11 (WiFi), and the like.

The one or more space sensors 12, one or more boundary sensors 14, one or more gateways 16, and processor 18 can be configured to execute a system communication protocol. For the simplicity of explanation, all space sensors 12 and boundary sensors 14 shall be referred to herein as "endpoints". The system communication protocol will be described in some aspects using a singular endpoint and a singular gateway, but the concepts are applicable to multiple endpoints and gateways, unless the context clearly dictates otherwise.

The motion sensors described herein can also include various fall sensors, orientation sensors, height sensors, and the like (not illustrated).

The systems described herein can also include a motion sensor calibration tool. The motion sensor calibration tool can include a sensor signal generator. The sensor signal generator is an object that produces a known signal from a motion sensor when located at a known orientation relative to the motion sensor. For example, the sensor signal generator can be an electromagnetic radiation emitter that provides a known electromagnetic signal in a known direction, and which can provide a known response in a motion sensor given information regarding the relative positioning and orientation of the two. Referring to FIG. 2, a sensor signal generator in the form of an electromagnetic radiation emitter 30 is illustrated. As another example, the sensor signal generator can be an actuator (i.e., a linear actuator, rotational actuator, or the like) coupled to a motion target. The actuator can be activated to initiate a motion that is known. The known motion can provide a known response in a motion sensor given information regarding the relative position and orientation of the two. Referring to FIG. 3, a sensor signal generator in the form of an actuator 32 coupled to a motion target 34 is illustrated.

The motion sensor calibration tool also include a memory having stored thereon instructions that, when executed by the processor, cause the processor to initiate a signal generation algorithm in the sensor signal generator. The signal generation algorithm causes the signal sensor generator to initiate an emission or an action that produces a predictable motion signal from a motion sensor when the signal sensor generator is positioned within the motion sensor's field of view or in a known position within the motion sensor's field of view. The instructions can cause the processor to calibrate the motion sensing system based on the predictable motion signal. The instructions can further cause the processor to initiate acquisition of a baseline motion signal from the motion sensor in the absence of the signal generation algorithm and to calibrate the motion sensing system based on the baseline motion signal.

In some cases, where the sensor signal generator is an infrared emitter, the sensor signal generator can emit a constant intensity infrared signal, a time-varying infrared signal, a pulsed infrared signal, or another infrared signal that has some characteristic property known to be useful for calibration in the sensing arts. The infrared emitter can be a point source that emits in substantially all directions or a directional source. The infrared emitter can be stationary or can be mounted to a moving arm, robot, or other mechanism by which a predictable movement can be initiated.

Control of the sensor signal generator can be remote, for example, via a computing device, such as a laptop, smart phone, tablet, or the like, or can be local, for example, via a switch or a button on the sensor signal generator.

The present disclosure includes various methods, as discussed below. These methods can be used in combination with various features of the systems described above or with other aspects of different methods described below, unless the context clearly dictates otherwise.

In an aspect, the present disclosure provides a method of operating a passive motion sensor system. The passive motion sensor system includes a passive motion sensor. The passive motion sensor generates a passive motion signal in response to a sensed motion in a space to which the passive motion sensor is associate. The method includes: a) operating the passive motion sensor in a high threshold operating mode, wherein the high threshold operating mode includes a first signal threshold; and b) subsequent to step a), in response to the passive motion signal exceeding the first signal threshold, operating the passive motion sensor in a low threshold operating mode, wherein the low threshold operating mode includes a second signal threshold that is lower than the first signal threshold. In some cases, the method can include: a) operating the passive motion sensor in a high threshold operating mode, wherein the high threshold operating mode includes a first signal threshold; and b) subsequent to step a), in response to the passive motion signal exceeding the first signal threshold, operating the passive motion sensor with a threshold adjustment function having a time-dependent signal threshold, wherein the time-dependent signal threshold is lower than the first signal threshold for at least a portion of the threshold adjustment function. It should be appreciated that the low threshold operating mode is simply a threshold adjustment function that is a step function.

When the passive motion signal exceeds the second signal threshold or the time-dependent signal threshold, the method can further include providing an occupancy signal indicative of occupancy of the space to which the passive motion sensor is associated. As processor that is co-housed with the passive motion sensor can execute the providing of the occupancy signal. The first signal threshold, the second signal threshold, and/or the time-dependent signal threshold can be stored on a memory that is co-housed with the passive motion sensor.

The second signal threshold can be less than 75%, less than 50%, less than 40%, less than 30%, less than 25%, less than 20%, less than 15%, less than 10%, less than 5%, or less than 1% of the first signal threshold. The time-dependent signal threshold can be less than 75%, less than 50%, less than 40%, less than 30%, less than 25%, less than 20%, less than 15%, less than 10%, less than 5%, or less than 1% of the first signal threshold for at least a portion of the threshold adjustment function.

The threshold adjustment function can have a constant time-dependent signal threshold or can have a time-varying time-dependent signal threshold. The threshold adjustment function can be a step function having one, two, three, four, five, or more, up to N different time-dependent signal thresholds. In cases having multiple time-dependent signal thresholds, the time-dependent signal thresholds can increase over time.

Once the system is operating in the low threshold operating more or with the threshold adjustment function, the methods can return to operating the passive motion sensor in the high threshold operating mode based on a variety of different conditions. For example, the methods can include returning to the high threshold operating mode after a given length of time has passed following the passive motion signal exceeding the first signal threshold. As another example, the methods can include returning to the high threshold operating mode after a given length of time has passed following the passive motion signal exceeding the second signal threshold or the time-dependent signal threshold. As yet another example, the methods can include both of these conditions for returning to the high threshold operating mode and can return based on whichever condition occurs later.

In an aspect, the present disclosure provides a method of operating a passive motion sensor system. The passive motion sensor system includes a passive motion sensor. The passive motion sensor generates a passive motion signal in response to a sensed motion in a space to which the passive motion sensor is associate. The method includes: a) acquiring the passive motion signal from the passive motion sensor over a predetermined length of time, thereby providing a time-dependent passive motion signal; b) processing the time-dependent passive motion signal using a human-like motion analysis algorithm that distinguishes between motions having a time-varying component that is characteristic of human movement; c) in response to the human-like motion analysis algorithm determining that a motion is characteristic of human movement, providing an occupancy signal indicative of occupancy of a space to which the passive motion sensor is associated.

The human-like motion analysis algorithm can include one or more of a frequency-analysis algorithm, a narrow bandpass filter configured to isolate frequencies that are characteristic of human movement, a transform of the time-dependent passive motion signal into a frequency-domain signal, a derivative of the time-dependent passive motion signal, and an integral of the time-dependent passive motion signal. The frequencies that are characteristic of human movement can be between 0.1 Hz and 2 Hz.

In some cases, the methods can include of an environmental motion filter. The environmental motion filter can be essentially the opposite of the human-like motion analysis algorithm, where the time-varying component is characteristic of non-human movements.

In some cases, the various signal thresholds and threshold adjustment functions can be stored locally in a memory that is co-housed with the passive motion sensor. In some cases, the various comparisons of signals with the various signal thresholds and threshold adjustment functions can be executed by a processor that is co-housed with the passive motion sensor. These two features afford energy efficient operation of the system. While memory retrieval and processing can consume energy, the relative energy cost of these functions is low compared with the energy cost of transmitting information, even when using a low energy transmission protocol, such as those described above.

In certain aspects, the present disclosure provides a method of tuning a passive motion sensor or a passive motion sensor system. The method can include removing all motion-inducing elements from the room, providing a remote signal indicating that the room is unoccupied, recording a baseline signal, and then adjusting subsequent signals using the baseline signal.

The method of tuning the passive motion sensor or the passive motion sensor system can also include intentionally inducing a signal or a motion for the purposes of tuning sensitivity of the sensor or system. The method can include use of the motion sensor calibration tool described above. The method can include: a) emitting an electromagnetic radiation (such as infrared radiation in the case of a PIR sensor) of a known magnitude at a known location or moving a motion target at the known location, the known location positioned within a field of view of the motion sensor; b) measuring a calibration motion signal using the motion sensor during the emitting or moving of step a); and c) calibrating the motion sensing system using the calibration motion signal and the known location. The method can also include: d) measuring a baseline motion signal using the motion sensor in the absence of the emitting or moving of step a); and e) calibrating the motion sensing system using the baseline motion signal. Steps d) and e) of this method can be executed as described above with respect to other aspects of methods of tuning the system or sensor.

In an aspect, the present disclosure provides a method of sensing motion using a motion sensing system including two or more motion sensors. The method includes: a) for each of the two or more motion sensors, generating a motion confidence index that includes a probability that a given motion sensor is sensing a desired motion of interest (i.e., that it has not failed or lost accuracy) (using techniques such as resampling of time series to detect change points, or encoding sensor failure as a state in a dynamic Bayesian network or hidden Markov model representation of the sensing system, which is described in more detail in Example 6.5 of "Probabilistic Graphical Models: Principles and Techniques" by Koller and Friedman); b) sending the motion confidence index for each of the two or more motion sensors to a processor; and c) using the sensor readings and the motion confidence index for each of the two or more motion sensors, determining whether or not the desired motion of interest occurred. The motion confidence index can be computed by considering information such as a) data about sensor performance during a sensor calibration procedure, b) data about system performance provided by space users, c) data from other nearby sensors in the same space, d) data and models of "typical" sensor signals from "typical" motion, which could be collected during device development, and/or e) historical data from the sensor in question. This information can be tracked over time and any observed trends can be utilized in the motion confidence index.

In an aspect, the present disclosure provides a method of identifying relative positioning, location, and/or orientation of two or more motion sensors of a motion sensing system. The method includes: a) acquiring motion sense signals with the two or more motion sensors; b) comparing the acquired motion sense signals to determine if the two or more motion sensors are acquiring the same motions (using techniques such as Pearson's or Spearman's cross-correlation coefficients for time series, time series clustering leveraging distance metrics such as Dynamic Time Warping, principal components analysis for time series, or clustering based on distances between the frequency domain representations of the time series signals from sensors, which can be computed using techniques like the fast Fourier transform); and c) in response to the comparing of step b) and any available information regarding the sensed space, inferring information regarding the relative positioning and/or orientation of the two or more sensors. In some cases, the acquire motion sense signals of step a) are acquired in response to initiating a known motion or a known emission of electromagnetic radiation. For example, the calibration methods described elsewhere herein with respect to the motion sensor calibration tool can be utilized in this method.

The methods described above can in turn be utilized in broader methods of determining the probability that a space is occupied, such as rule-based algorithms with thresholds trained on historical ground truth data, physics-based approaches, supervised learning techniques that do not explicitly consider the time series nature of the data (see, for example, "Elements of Statistical Learning" by Hastie et al.), probabilistic graphical models that explicitly consider the time series nature of the data (e.g., dynamic Bayesian networks or hidden Markov models, see, for example, "Probabilistic Graphical Models: Principles and Techniques" by Koller and Friedman), or neural network models that explicitly consider the time series nature of the data, such as the long short term memory recurrent neural network framework (see, for example, Hochreiter and Schmidhuber, "Long short-term memory," Neural Computation 9.8 (1997), pages 1735-1780 and corresponding discussion in lecture 11 of the Stanford CS20SI TensorFlow course) or the gated recurrent units recurrent neural network framework (see, for example, Chung, Junyoung et al., "Empirical evaluation of gated recurrent neural networks on sequence modeling," airXiv preprint airXiv: 1412.3555 (2014) and corresponding discussion in lecture 11 of the Stanford CS20SI TensorFlow course). These methods could be trained based on sensor and ground truth occupancy data collected before the deployment of sensors, based on additional data collected during a sensor calibration procedure, based on sensor data collected after the sensors have been deployed, and/or based on feedback from users of the outputs of the sensing system.

In methods of occupancy determination, the various signals and occupancy determinations discussed above can be paired with additional information, such as scheduling information regarding the space, information regarding the type of space, information regarding the size of a space, individual location monitoring information, and the like.

The present disclosure provides a method of tuning an occupancy determination algorithm to a specific space having known characteristics. The method includes: receiving the known characteristics of the specific space; and adjusting one or more parameters of the occupancy determination algorithm in response to the known characteristics.

In certain aspects, where scheduling information is known, the processor or gateway can transmit a signal to the passive motion sensor to instruct the sensor to enter into a "sensitive" mode (i.e., operating in the low threshold operating mode or activating the threshold adjustment function).

In certain aspects, where room-type information is known, the processor can make an occupancy determination based on a different set of rules for different rooms or room types. For example, if the system is deployed in a small room that is used as a quick huddle room or a room for phone conversations, then the occupancy determination can have less strict standards for releasing a room and indicating that the room is unoccupied. For a contrary example, if the system is deployed in a boardroom that is used for critical meetings only, then the occupancy determination can have more strict standards for releasing a room and indicating that the room is unoccupied.

In addition to using signals from the sensors described herein, the methods can utilize other inputs, such as meta data associated with a given user, space, etc., information from a user's personal planner and/or calendar, such as meeting schedules, general availability, etc., and the like.

In certain cases, the methods described herein can approximate the number of people in a given space.

EXAMPLE 1

Figure 7:
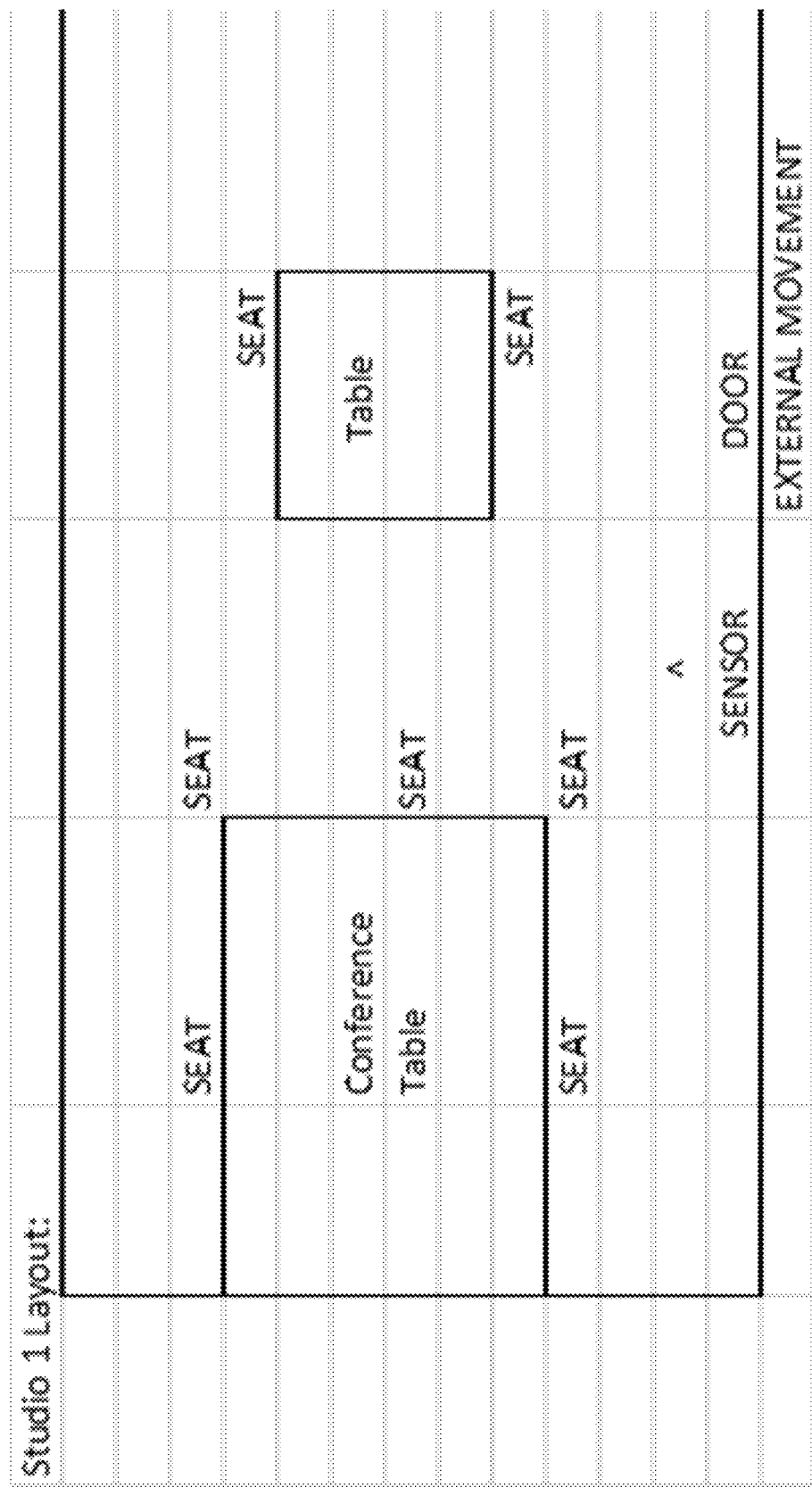
FIG. 7 is a top-down view of a space, as described in Example 1.

An exemplary room and sensor arrangement is illustrated in FIG. 7. The exemplary room was 211"×185". The ceiling was 144" high. The door was located along one of the 211" walls. The temperature for these experiments was 72.5° F. The sensor was positioned at 9 feet height (unless indicated otherwise, as described below in the height-adjustment tests) and angled at 45° below horizontal. The sensor was a 1548 model PIR sensor, available commercially from Excelitas Technologies, Wheeling, Ill., USA. A bandpass filter, 4-second window time, two pulse trigger, and 0.5-second blind time were used for experiments, unless otherwise indicated.

Factors in Table 1 were controlled in experiments. Table 2 shows the results of a min/max screening test.

TABLE 1

| INPUTS | DESCRIPTION | Test Values |
|---|---|---|
| PIR Sensitivity | Voltage threshold for detection | 0-1657.5 uV (50 uV Increments) |
| PIR Pulse Count | Number of pulses with a sign change required to trigger motion detection interrupt | 1, 2, 3 Pulses (3 options) |
| PIR Window Size | Time in which pulses (pulse counter) must occur for a motion detection interrupt to be friggered | 2, 4, 6 Seconds (3 options) |
| Installation Height | Installation height of the sensor on the wall. | 7, 8, 9 Feet (3 options) |
| External Movement (Major Motion | Major motion movement outside the room to measure impact of external movement. Test subject shall be walking per NEMA standards | Movement, No Movement |

TABLE 2

| Changing Factor | Units | Physics High | Low | SME High | Low | Realistic High | Low | Ease of changing | Est. of 1st Order Impact |
|---|---|---|---|---|---|---|---|---|---|
| PIR Sensitivity | uV | 1657.5 | 0 | 1250 | 30 | 400 | 60 | High | High |
| PIR Pulse Count | Pulses | 4 | 1 | 3 | 1 | 2 | 1 | High | High |
| PIR Window Size | Sec | 16 | 4 | 12 | 4 | 8 | 4 | High | High |
| Installation Height | Feet | 12 | 0 | 9 | 7 | 8 | 8 | Medium | Medium |
| External Movement (Major Motion) | HBM | Movement | No Movement | Movement | No Movement | Movement | No Movement | High | Medium |

Table 3 shows factors that can be controlled, but which were held constant in experiments.

TABLE 3

| INPUTS | DESCRIPTION |
|---|---|
| PIR Blind Time | Time for which sensor will ignore motion after it performs motion detection interrupt (actually after host MCU takes direct link high to low) |
| PIR Op Mode | Whether or not the sensor provides interrupts to the MCU |
| PIR Filter Source | No Testing: Voltage source provided when a data read is performed by the host MCU. When using the "Wake Up" op mode, BPF or LPF must be selected |
| PIR High-Pass Cutoff Freq (1548 only) | No Testing: High frequency cutoff for band-pass filter. |
| PIR Pulse Detection Mode (1548 only) | Whether or not a sign change is required when the signal exceeds the threshold to be considered a pulse. |
| Sensor Presentation Angle | Current testing will be done normal to the sensor. This assumes that the sensor lens is appropriately designed. It may be necessary to test the lens capabilities under various angles. |
| Installation Height | Current BKM installation is listed from 7-9 feet in increments of 1 foot. It is assumed that the installer has utilized the proper angle and tilt settings per design recommendations |
| Room Size | Four room sizes are determined for this project. Focus Room (<70 sq. ft [2ppl]) Huddle Room (70-175 sq. ft [3-5ppl]) Conference Room (175-350 sq. ft [6-10ppl]) Ex. Lg Conference Room (350-560 sq. ft [5-16ppl]) |
| Unique Room Features | Non-uniform variances in room types such as: Room dimensions/layout Furniture layout Double-wide Entrance Doors Unique window placement/number Manufacturers suggest mounting the PIRs in such a way that the PIR cannot "see" out of a window. Although the wavelength of infrared radiation to which the chips are sensitive does not penetrate glass very well, a strong infrared source (such as from a vehicle headlight or sunlight) can overload the sensor and cause a false alarm. A person moving on the other side of the glass would not be "seen" by the PID. That may be good for a window facing a public sidewalk, or bad for a window in an interior partition. |

TABLE 3-continued

| INPUTS | DESCRIPTION |
|---|---|
| HVAC Distance and Relative Temp | Avoid mounting sensors close to air vents, as the vibration and air flow can reduce the effectiveness of the sensor (PIR sensors should not be within 4 ft of an air vent, and ultrasonic sensors should not be within 6 ft of an air vent).<br>It is also recommended that the PIR not be placed in such a position that an HVAC vent would blow hot or cold air onto the surface of the plastic which covers the housing's window. Although air has very low emissivity (emits very small amounts of infrared energy), the air blowing on the plastic window cover could change the plastic's temperature enough to trigger a false alarm.<br>Hot objects and moving air currents can affect the sensor's performance.<br>Don't aim at air conditioners, heat vents, fireplaces, intermittent heat sources, etc. |
| Sensor Type | Corner, wall, curtain and ceiling brackets are currently utilized |
| Room Temperature | The sensor's performance depends on a differential between the ambient room temperature and the temperature of room occupants. Warmer rooms may reduce the sensor's ability to detect occupants. |
| Direct Sunlight | Care should be taken to avoid mounting in direct sunlight, however the degree to which direct sunlight affects the sensor is unknown at this time. |
| Low Movement | Non-movement or quick movements of the heat source inside the detection area. |
| IR Signature and Movement Distance | The IR signature of the person, distance, and actual movement are all factors that enable the detection of movement by the PIR sensor |

Table 4 contains the values for the factors named in Table 3.

TABLE 4

| Constant Factor | Units | Constant | Ease of changing | Est. of 1st Order Impact |
|---|---|---|---|---|
| PIR Blind Time | Sec | 2 seconds | High | Low |
| PIR OP Mode | NA | Wake up Mode | High | Low |
| PIR Filter Source | NA | Bandpass | High | Medium |
| PIR High-Pass Cuttoff Freq | Hz | 0.4 Hz | High | Medium |
| PIR Pulse Detection Mode | NA | +/− Required | High | None |
| Sensor Presentation Angle | Deg | 45 deg | Low | Unknown |
| Room Size | NA | Studio 1 used | Low | Unknown |
| Unique Room Features | NA | Studio 1 used | Low | Unknown |
| HVAC Distance | Ft | >4 feet | High | High |
| HVAC Relative Temp | DegF. | HVAC shall be verified off during testing and placed | Low | Unknown |
| Low Movement | NA | Test Person: Mychal Hall | Low | Unknown |
| Direct Sunlight | NA | Curtains shall be closed | High | Unknown |
| Room Temperature | DegF. | 73 degF. | Medium | High |
| Movement IR Distance | Ft | Test person shall be moving orthogonal to the sensor, at a test velocity of 1.0 m/s, at maximum distance | Medium | High |
| Movement IR Signiture | NA | Test Person: Mychal Hall | Medium | High |
| Sensor Type (Wall, Ceiling, Curtain) | NA | Wall Sensor | High | High |

Table 5 contains the results of screen test design, varying the factors described above in Table 1. The "pattern" column represents a value selection for the variables listed at the top of columns 2-6 of Table 5. A "+" sign indicates that the maximum value was used, a "−" sign indicates that the minimum value was used, and a "0" indicates that a middle value was used. Using the PIR Sensitivity as an example, the +corresponds to 1250, the −corresponds to 125, and the 0 corresponds to 687.5. Y-Major Motion Sensed and Notes columns represent outputs of the analysis. For each of the set of parameters investigates, no external movement was detected.

TABLE 5

| Pattern | PIR Sensitivity | PIR Pulse Count | PIR Window Size | Install Height | Ext. Movement | Y - Major Motion Sensed | Notes |
|---|---|---|---|---|---|---|---|
| ++−−− | 1250 | 2 | 4 | 7 | 0 | 0 | No External Movement Detected |
| 0+00− | 687.5 | 2 | 8 | 8 | 0 | 1 | No External Movement Detected |
| +−+−− | 1250 | 1 | 12 | 7 | 0 | 1 | No External Movement Detected |
| 0−00− | 687.5 | 1 | 4 | 9 | 10 | 1 | No External Movement Detected |
| +−−++ | 1250 | 1 | 4 | 9 | 10 | 0 | No External Movement Detected |
| −−++− | 125 | 1 | 12 | 9 | 0 | 1 | No External Movement Detected |
| −+−+− | 125 | 2 | 4 | 9 | 0 | 1 | No External Movement Detected |
| −−−−+ | 125 | 1 | 4 | 7 | 10 | 1 | No External Movement Detected |
| −++−+ | 125 | 2 | 12 | 7 | 10 | 1 | No External Movement Detected |

TABLE 5-continued

| Pattern | PIR Sensitivity | PIR Pulse Count | PIR Window Size | Install Height | Ext. Movement | Y - Major Motion Sensed | Notes |
|---|---|---|---|---|---|---|---|
| 0–00+ | 687.5 | 1 | 8 | 8 | 10 | 1 | No External Movement Detected |
| +++++ | 1250 | 2 | 12 | 9 | 10 | 0 | No External Movement Detected |

Figure 8:
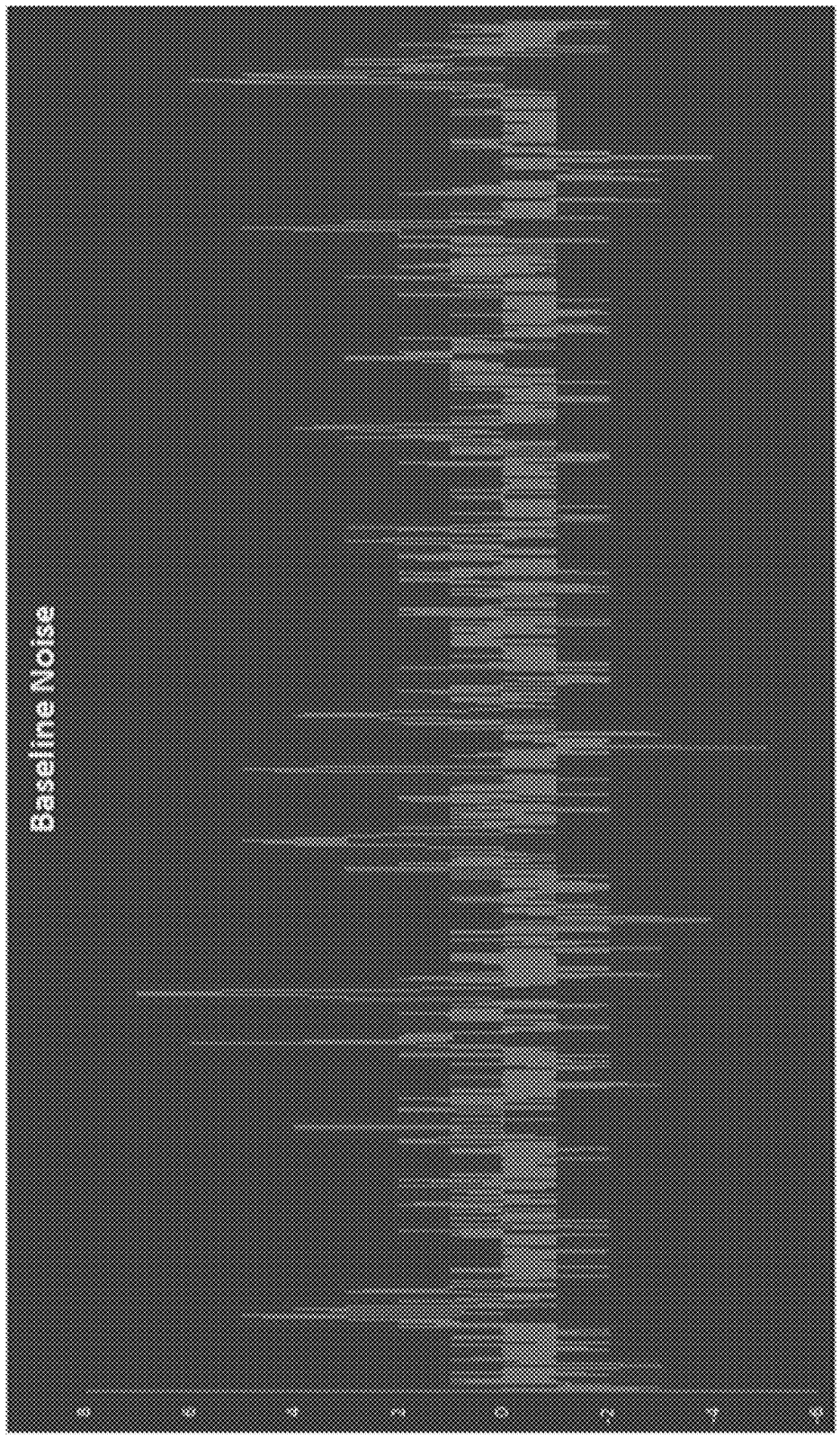
FIG. 8 is a baseline noise signal, as described in Example 1.

Referring to FIG. 8, a baseline noise spectrum was taken. The y-axis units are μV. When monitoring the baseline noise, it was noticed that the "waking up" of the PIR sensor contributes significantly to the noise levels. Increasing the blind time to 2 second significantly reduced this noise increase.

Figure 9:
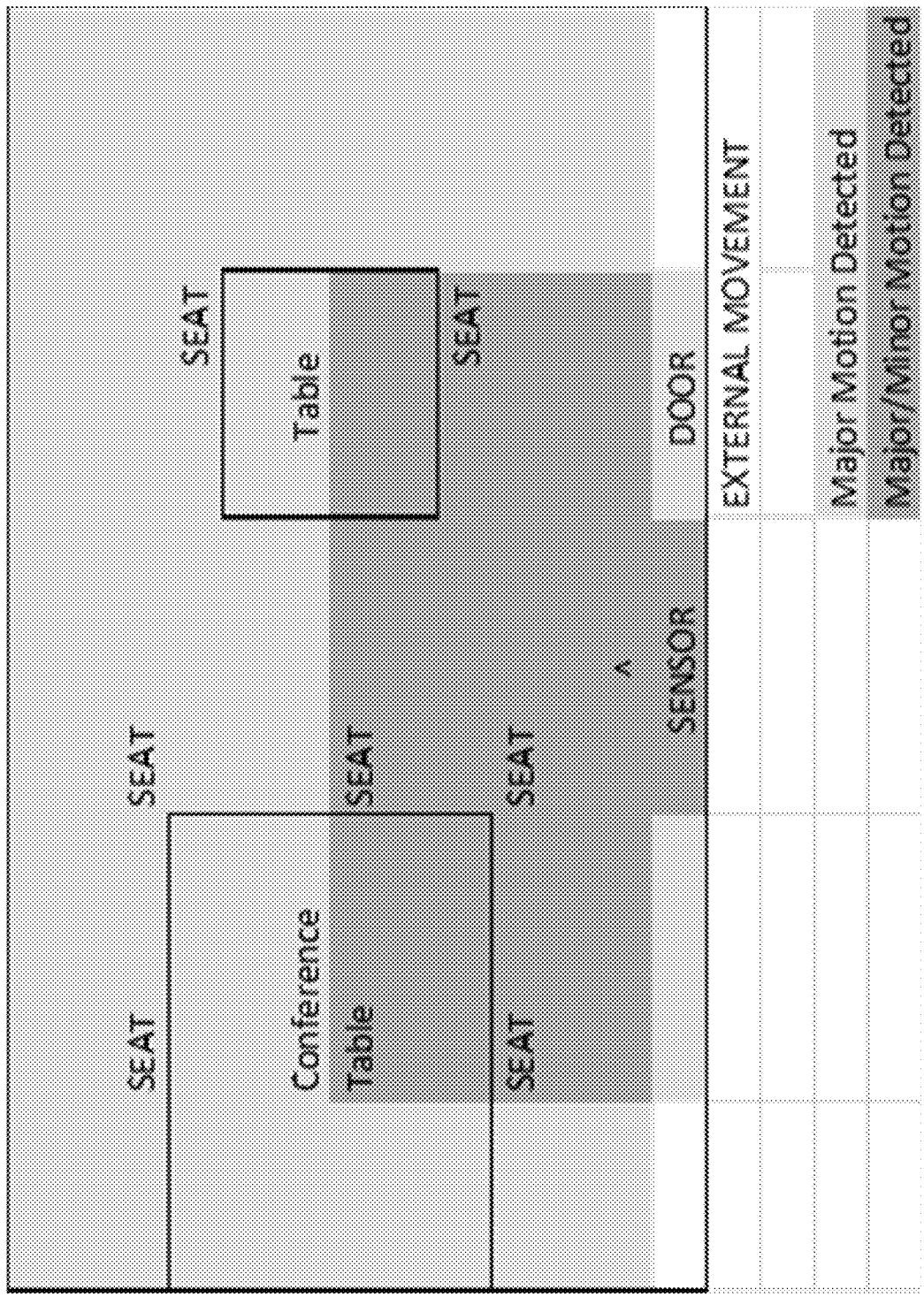
FIG. 9 is a view of sensor coverage of a space, as described in Example 1.

A major motion test was performed with a 125 μV motion detection threshold and a 4 second blind. The major motion was measured in all locations in the room, save ~2 square feet in the corners that touch the wall to which the sensor was mounted. A minor motion test was done in the seated locations, using the same parameters. Referring to FIG. 9, the light gray represents areas of the room where major motion was detected and minor motion was not detected and the dark gray area represents areas of the room where both major and minor motion were detected.

Figure 10:
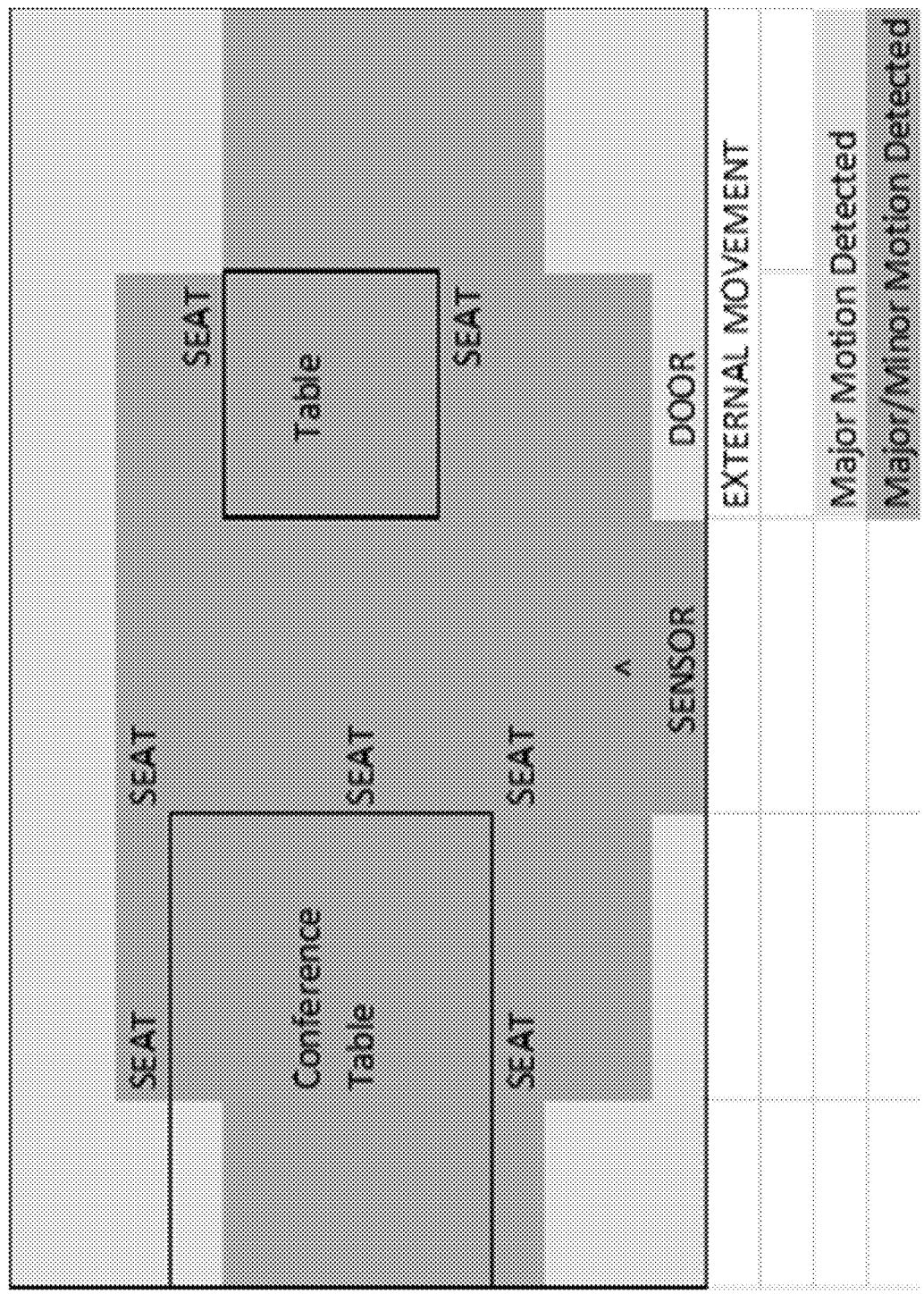
FIG. 10 is a view of sensor coverage of a space, as described in Example 1.
Figure 11:
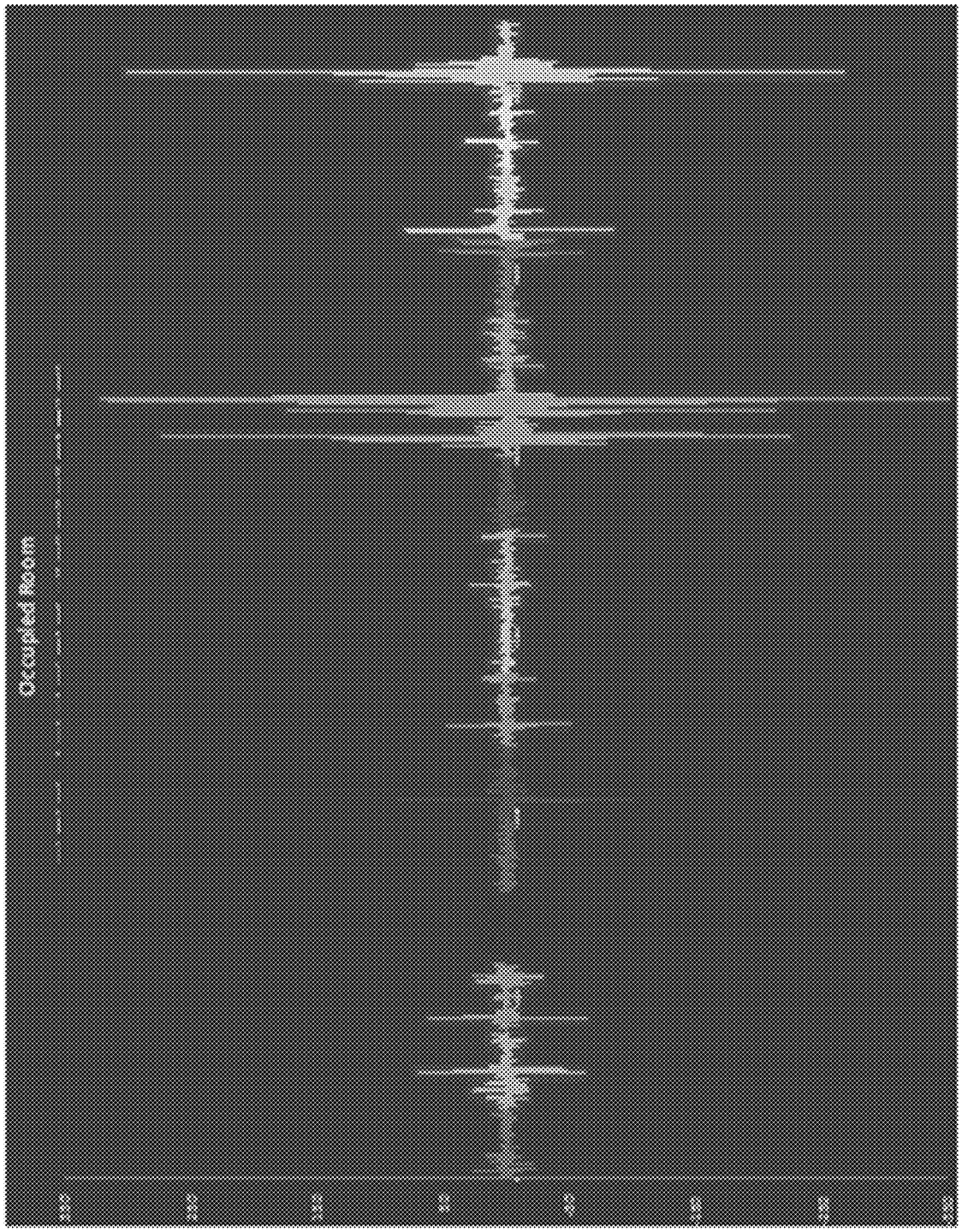
FIG. 11 is a plot of continuous movement monitoring, as described in Example 1.

A second major and minor motion test was performed with a 60 μV motion detection threshold and a 4 second blind. The results are shown in FIG. 10, with the same convention for light and dark gray areas. The minor motion is now detected in all seated positions, including those farthest from the sensor.

Continuous data was collected for an occupied room over the course of 20 minutes. Varying thresholds were used to describe an event as an "occupied" event. Using a 200 μV threshold, 22 "occupied" events were registered in 20 minutes. Using a 400 μV threshold, 14 "occupied" events were registered in 20 minutes. Using a 800 μV threshold, the only events identified were when an occupant walked directly in front of the sensor when entering and leaving the room. These experiments illustrate feasibility of using a higher threshold to determine entrance and exit from the space and a lower threshold to determine continued occupancy of the space, as described in various methods set forth above.

Figure 12:
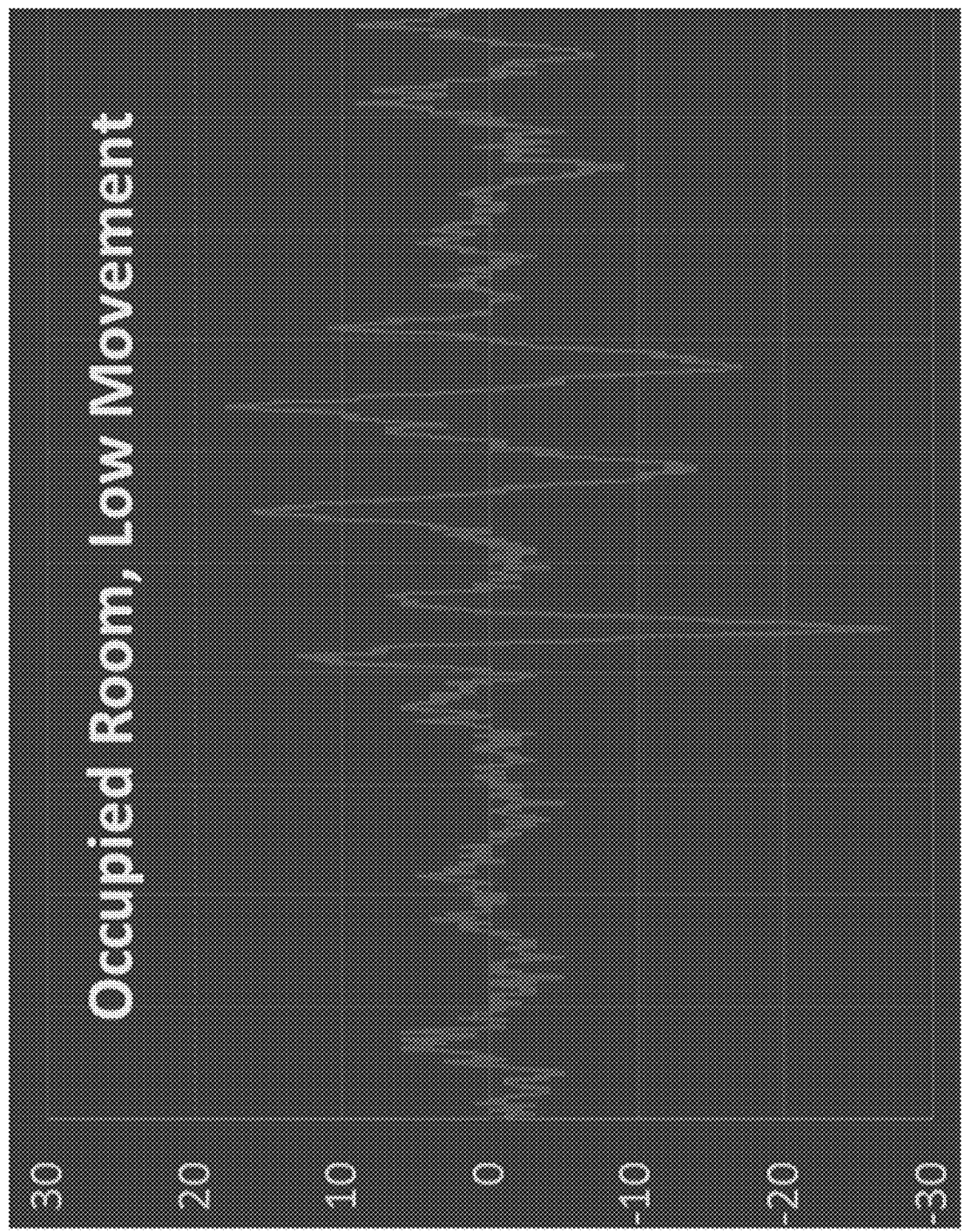
FIG. 12 is a plot of low movement signals from a human being, as described in Example 1.
Figure 13:
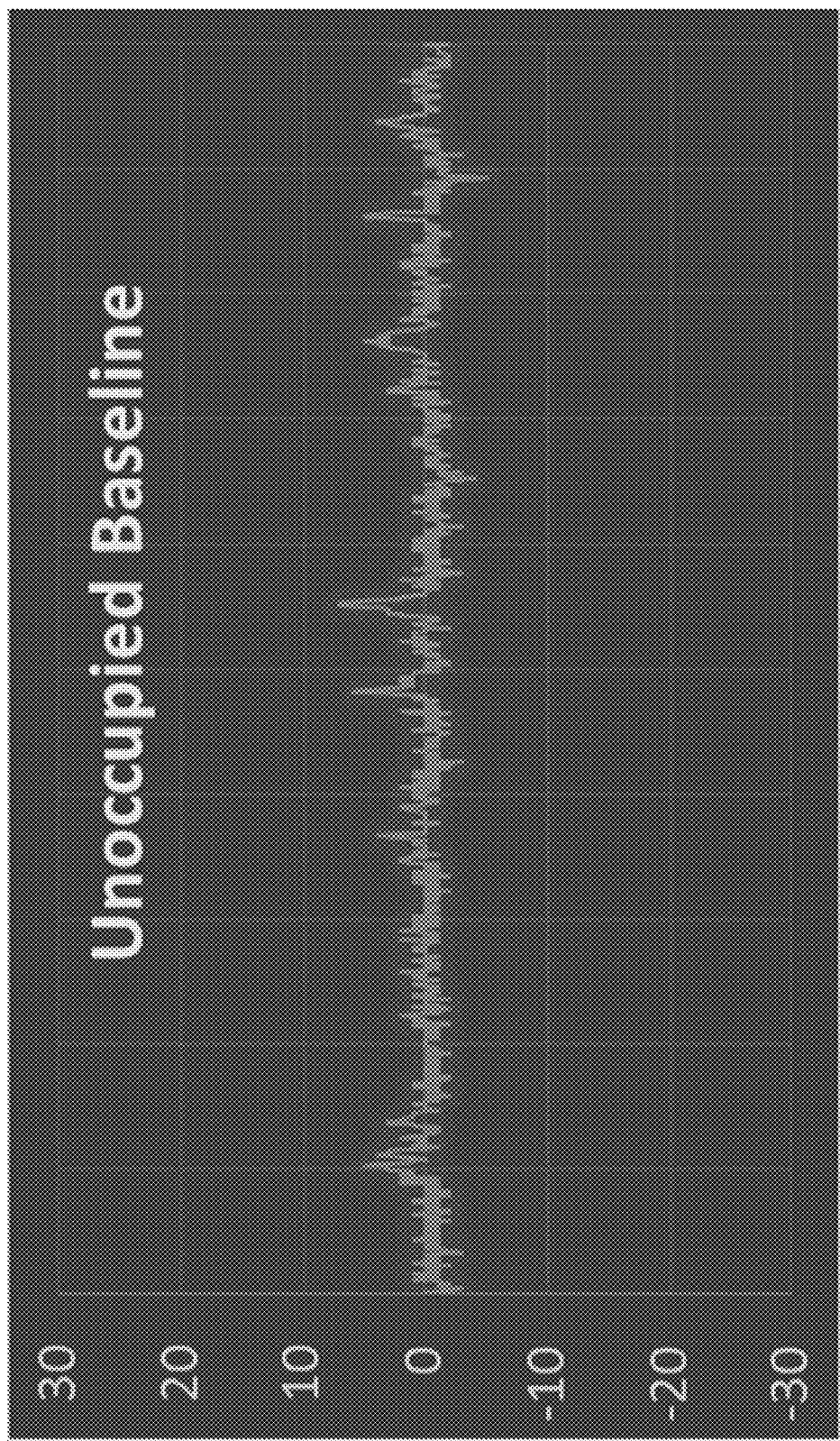
FIG. 13 is a plot of unoccupied baseline signals, as described in Example 1.

A short time window of low-movement data for an occupied room is shown in FIG. 12 and a time window of the same length for an unoccupied room is shown in FIG. 13. The data for the occupied room shows a time-dependent pattern that is characteristic of human movement. In addition, these data sets illustrated that a lower voltage threshold can be used to detect occupancy.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the disclosures described herein can be embodied within a form that does not provide all of the features and benefits set forth herein, as some features can be used or practiced separately from others. The scope of certain disclosures disclosed herein is indicated by the appended claims rather than by the foregoing description. All changes which come within the meaning and range of equivalency of the claims are to be embraced within their scope.

We claim:

1. A method of operating a motion sensor system, the motion sensor system including a motion sensor that generates a motion signal in response to a sensed motion in a space to which the motion sensor is associated, the method comprising:
   a) operating the motion sensor in a high threshold operating mode, wherein the high threshold operating mode includes a first signal threshold; and
   b) subsequent to step a), in response to the motion signal exceeding the first signal threshold, operating the motion sensor in a low threshold operating mode, wherein the low threshold operating mode includes a second signal threshold that is lower than the first signal threshold.

2. The method of claim 1, the method further comprising:
   c) subsequent to step b), in response to the motion signal exceeding the second signal threshold, providing an occupancy signal indicative of occupancy of the space to which the motion sensor is associated.

3. The method of claim 2, wherein a processor that is co-housed with the motion sensor executes step c) and transmits the occupancy signal.

4. The method of claim 1, wherein the first signal threshold and/or the second signal threshold is stored on a memory that is co-housed with the motion sensor.

5. The method of claim 1, wherein the second signal threshold is less than half of the first signal threshold.

6. The method of claim 1, wherein the second signal threshold is less than one quarter of the first signal threshold.

7. The method of claim 1, wherein the second signal threshold is less than one tenth of the first signal threshold.

8. The method of claim 1, the method further comprising:
   d) subsequent to step b), after a predetermined length of time has passed following the motion signal exceeding the first signal threshold, returning to operating the motion sensor in the high threshold operating mode and/or providing a non-occupancy signal indicative of non-occupancy of the space to which the motion sensor is associated.

9. A method of operating a motion sensor system, the motion sensor system including a motion sensor that generates a motion signal in response to a sensed motion in a space to which the motion sensor is associated, the method comprising:
   a) operating the motion sensor in a high threshold operating mode, wherein the high threshold operating mode includes a first signal threshold;
   b) subsequent to step a), in response to the motion signal exceeding the first signal threshold, operating the motion sensor with a threshold adjustment function having a time-dependent signal threshold, wherein the time-dependent signal threshold is lower than the first signal threshold for at least a portion of the threshold adjustment function.

10. The method of claim 9, the method further comprising:
   c) subsequent to step b), in response to the motion signal exceeding the time-dependent signal threshold, providing an occupancy signal indicative of occupancy of the space to which the motion sensor is associated.

11. The method of claim 9, the method further comprising:

in step b), in response to the motion signal exceeding the first signal threshold, providing an occupancy signal indicative of occupancy of the space to which the motion sensor is associated.

12. The method of claim 9, the method further comprising:

d) subsequent to step b), after a predetermined length of time has passed following the motion signal exceeding the first signal threshold, returning to operating the motion sensor in the high threshold operating mode and/or providing a non-occupancy signal indicative of non-occupancy of the space to which the motion sensor is associated.

13. The method of claim 9, wherein the threshold adjustment function is a step function.

14. The method of claim 13, wherein the step function includes two or more time-dependent signal threshold values.

* * * * *